Oct. 23, 1951          C. FIELD          2,572,328

MACHINE AND METHOD OF MAKING ICE OR THE LIKE

Filed April 5, 1945          8 Sheets-Sheet 1

Fig. 1.

INVENTOR
*Crosby Field*
BY
*Blair, Curtis + Hayward*
ATTORNEYS

Oct. 23, 1951            C. FIELD          2,572,328

MACHINE AND METHOD OF MAKING ICE OR THE LIKE

Filed April 5, 1945                                8 Sheets-Sheet 2

INVENTOR
Crosby Field
BY
Blair, Curtis & Hayward
ATTORNEYS

Oct. 23, 1951     C. FIELD     2,572,328
MACHINE AND METHOD OF MAKING ICE OR THE LIKE
Filed April 5, 1945     8 Sheets-Sheet 3

INVENTOR
*Crosby Field*
BY
*Blair, Curtis & Hayward*
ATTORNEYS

Oct. 23, 1951          C. FIELD         2,572,328
MACHINE AND METHOD OF MAKING ICE OR THE LIKE
Filed April 5, 1945                        8 Sheets-Sheet 4

INVENTOR
Crosby Field
BY
Blair, Curtis & Hayward
ATTORNEYS

Oct. 23, 1951     C. FIELD     2,572,328
MACHINE AND METHOD OF MAKING ICE OR THE LIKE
Filed April 5, 1945     8 Sheets-Sheet 7

INVENTOR
Crosby Field
BY
Blair, Curtis + Hayward
ATTORNEYS

Oct. 23, 1951 C. FIELD 2,572,328
MACHINE AND METHOD OF MAKING ICE OR THE LIKE
Filed April 5, 1945 8 Sheets-Sheet 8

Fig. 13.

INVENTOR
Crosby Field
BY
Blair, Curtis + Hayward
ATTORNEYS

Patented Oct. 23, 1951

2,572,328

UNITED STATES PATENT OFFICE 2,572,328

MACHINE AND METHOD OF MAKING ICE OR THE LIKE

Crosby Field, Brooklyn, N. Y., assignor to Flakice Corporation, Brooklyn, N. Y., a corporation of Delaware Application April 5, 1945, Serial No. 586,738

27 Claims. (Cl. 62—106)

This invention relates to refrigeration and more particularly to the automatic forming of small bodies or cubes of ice.

An object of this invention is to provide an apparatus and method for making ice in the form in which the ice is to be used. A further object is to provide for the congealing of a liquid in spaced zones so that individual frozen units are formed. A further object is to provide apparatus of the above character which is simple and compact, and yet sturdy and durable in construction. A still further object is to provide apparatus of the above character which is efficient in the utilization of the refrigerating medium, both with respect to the refrigerant used, and with respect to the variation in the load upon the system. Another object is to provide for the removal of ice from the surface upon which it is formed by producing a sudden shock which severs the ice bond between the ice and the surface. A further object is to provide a method and apparatus of simplified form for carrying out the above in a fully automatic manner. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings in which are shown several of many possible embodiments of the invention.

The present application relates to my copending application Serial Number 538,768, filed June 5, 1944, issued as Patent No. 2,488,529 on November 22, 1949, there being in both applications certain common subject matter and certain of the objects being the same.

In accordance with the present invention, ice is formed in the form of small cubes, the term "cube" being used in its broader sense to designate a small piece of ice of regular shape. While it is contemplated that the cubes may be other shapes such as round in cross-section, in the illustrative embodiments of the present invention the ice is made in square tubes, and the resulting pieces of ice are square in cross-section and thus substantially cubes except that a hole extends through each of them along the axis of the freezing tubes. After being formed, the ice is freed or harvested without changing the form of the ice by suddenly heating the freezing tubes; this operation of freeing the ice from the tubes is at times referred to herein as "harvesting" the tube or tubes, although strictly speaking it is the ice cubes or ice bodies which are harvested from the tubes in which they are formed. The freezing and harvesting operations are carried on automatically, there being means to freeze ice continuously and intermittently operating means to harvest the ice.

In the past ice has been formed into large blocks or sticks which are then cut into small pieces of the desired size. This is inefficient and wasteful with regard to the time consumed and the use of apparatus not only during the freezing of the ice but in the cutting of the ice. Ice has been formed in cubes but in general this has been unsatisfactory, the main difficulty being that the prior apparatuses are complicated and inefficient. An object of the present invention is to overcome the objection to the prior art practices.

Figure 1:
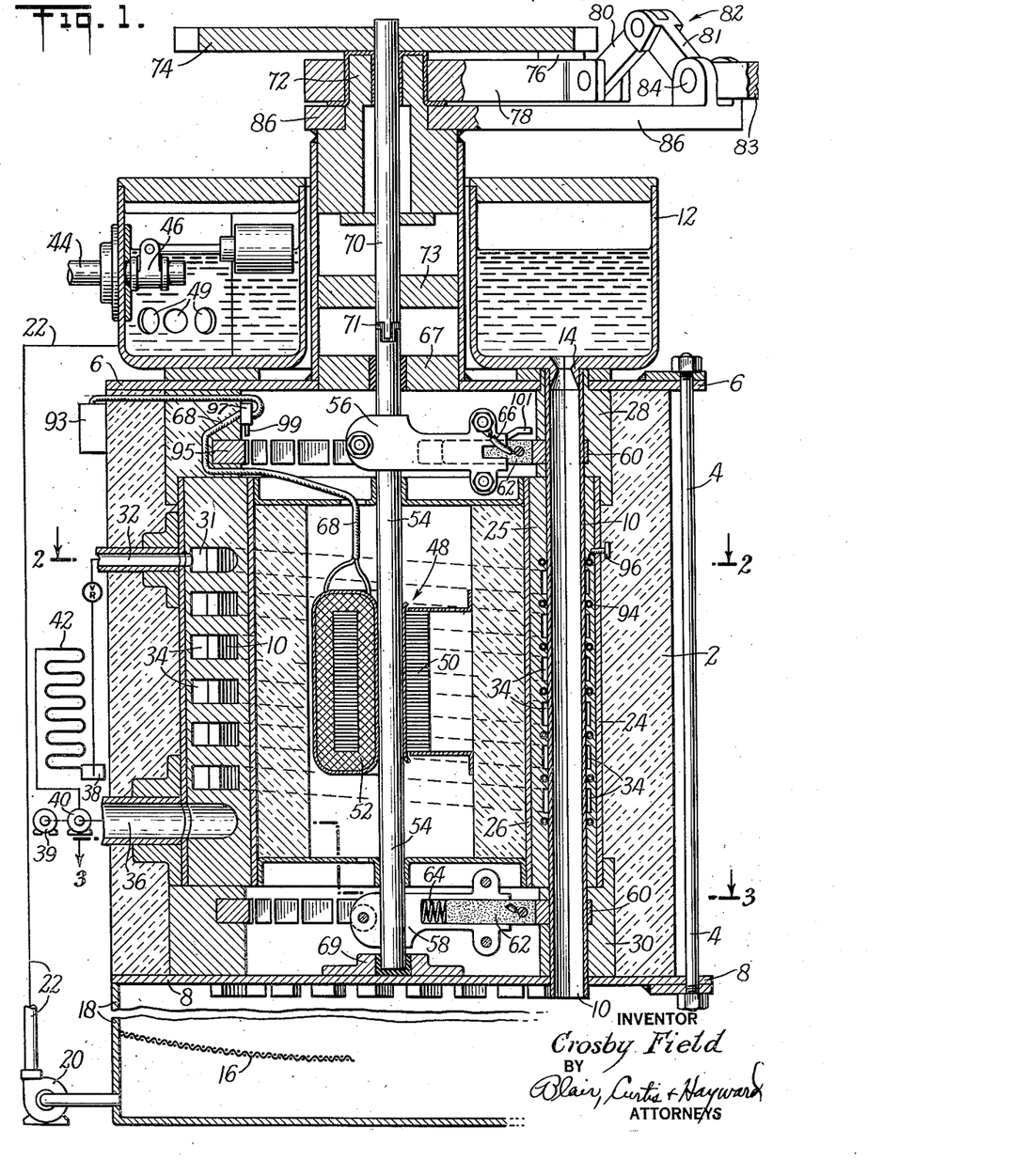
Figure 1 is a vertical section with parts broken away of one embodiment of the invention.

Referring particularly to Figure 1 of the drawings, the ice is formed in the central zone of a cylindrical casing 2 formed of a heat insulating plastic and clamped by a set of stay bolts 4 between a top plate 6 and a bottom plate 8. Extending between plates 6 and 8 and positioned in a circular row (see Figures 2 and 3) are twenty-one square freezing tubes 10, through which water is directed from an annular tank 12. Tank 12 rests upon the top of plate 6, and in the top of each freezing tube is a restricted nozzle 14 to limit the flow of water through the tube. The water which enters the tubes and is not frozen flows from the bottom of the tubes and thence through a screen 16 to a tank 18; from tank 18 the water is pumped back to tank 12 by pump 20 through a pipe 22 (represented schematically). During the harvesting operation of each tube the ice bodies or ice cubes fall onto screen 16 and are directed by the screen to a storage bin not shown. Concentrically embedded in casing 2 and forming therein an annular space 25 through which tubes 10 extend, are two steel cylinders 24 and 26. The annular space 25 between these cylinders is closed at the top and bottom respectively by terminal rings 28 and 30 of a hard plastic; thus, annular space 25 is pressure-tight, and provides an annular evaporator section. However, the major portion of this space is filled with natural or synthetic rubber or other plastic with the only opening being a spiral passageway 31 (see Figure 2) extending at the top from a liquid refrigerant inlet 32 and around and past the tubes 10 (as shown at 34) in six complete turns (see also Figure 1) to a gas refrigerant outlet 35. Thus an evaporator assembly is formed by the shell construction which encloses space 25 and the non-rigid plastic defining the spiral passageway 31. During operation refrigerant is evaporated within this evaporator assembly so as to freeze ice on the inner walls of the portions of freezing tubes 10 to 34 within this evaporator assembly.

Figure 2:
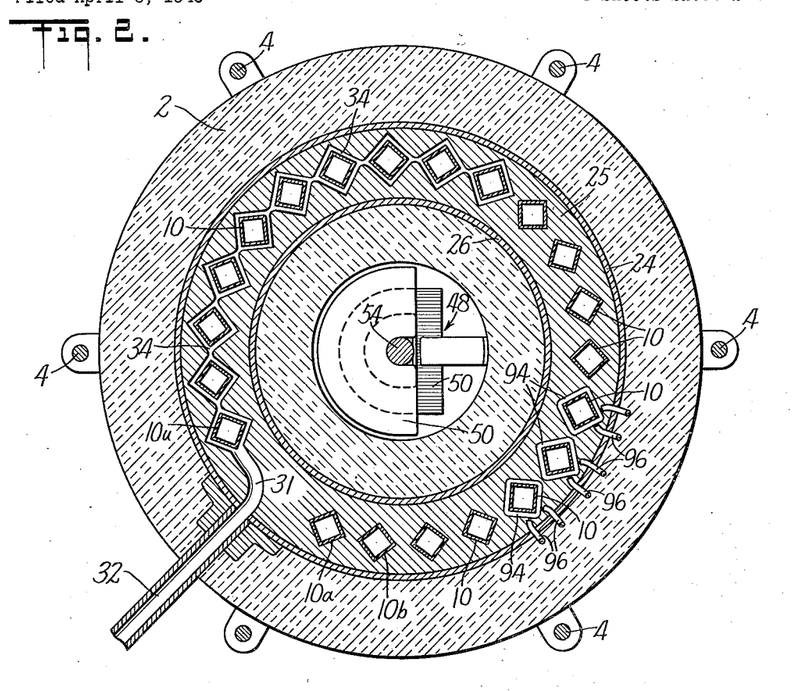
Figure 2 is a section on the line 2—2 of Figure 1.

In passing tubes 10 at 34 passageway 31 is divided into two branches so that the refrigerant makes contact with the tubes on all four sides. The width and pitch of the spiral of passageway 31 are such that the tubes are refrigerated in the spaced zones where it is desired that ice be formed with each zone being a length of tube equal to the desired size of the ice cube. The liquid refrigerant which enters at 32 is turned into gas as it passes around the six spiral turns, and the gas is discharged at the bottom through pipe 36. The six spiral turns produce in each freezing tube six spaced freezing zones where ice cubes are formed. As shown schematically, liquid refrigerant is supplied to pipe 32 from a receiver 38, and the gaseous refrigerant from pipe 36 is compressed by a compressor 40 driven by a motor 39 and condensed in a condenser 42. Water flows down the freezing tubes at sufficient velocity to cause the ice to be clear, and the water required to maintain the level indicated in tank 12 is largely supplied by pump 20 although the water frozen is replaced through a supply pipe 44 controlled by a float valve 46. As shown best in Figure 4, two partitions 45 and 47 extend across the tank on the opposite sides of the float and the partitions are provided with holes 49 (Figure 1) so that the water flows freely through the partitions.

The harvesting operation is performed by sending a high current of the magnitude of 200 to 1000 amperes through the tube walls; that is, the freezing tube itself may be considered as a resistance unit through which the high current passes so that the ice in the tube is given a sudden electrical blow and the ice is suddenly freed. The freeing or harvesting operation may be by the separate or combined effects of, melting the adhering layer of ice, and expanding the tube and thus shearing the tube surface from the ice. The tubes are harvested in sequence, there being means to cause the current to flow through one tube and then through the next tube progressively around the row or bank of tubes. The means for producing this current is a transformer 48 having an iron core 50, a primary winding 52 and a single turn secondary winding formed by a central copper shaft 54, a pair of distributor arms 56 and 58 at the ends of shaft 54 and one of tubes 10 (i. e., the tube which is then being harvested). Accordingly, at the top and bottom of each freezing tube are commutator segments 60 (see also Figure 3) to which the current is delivered from the distributor arms 56 and 58. Each of the distributor arms is provided with a copper brush 62, which is spring-pressed against the segments 60 by a spring 64 and is connected to the distributor arm by a flexible copper connector 66. Current is supplied to transformer 48 through a pair of leads 68 which pass upwardly in casing 2 and through ring 28 as will be more fully explained below.

Figure 4:
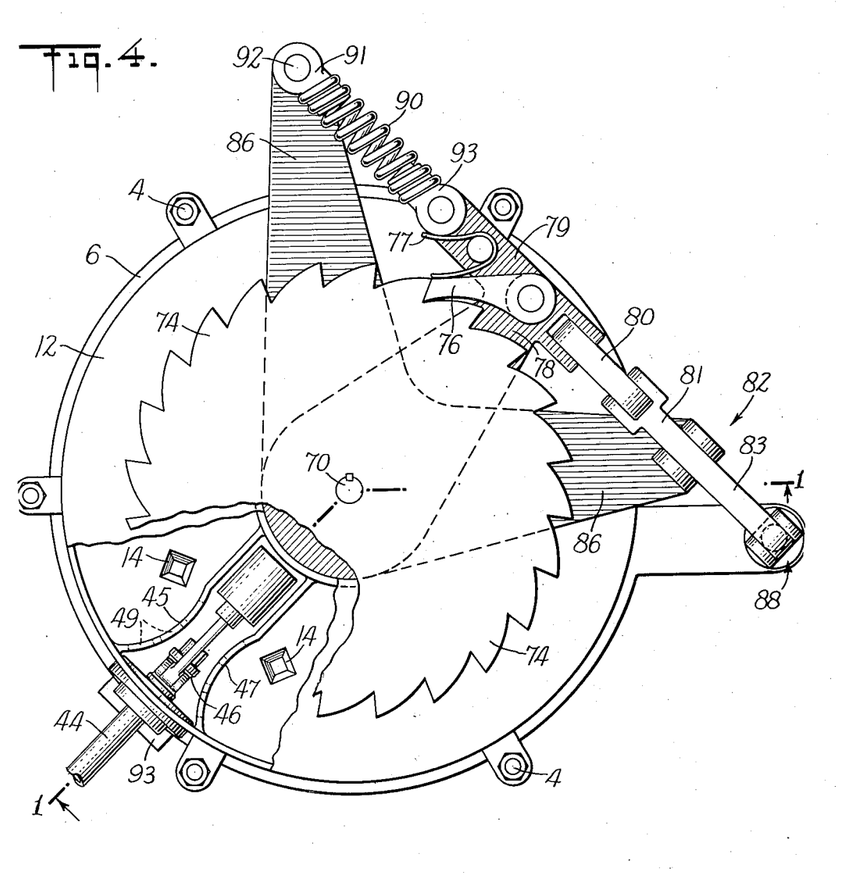
Figure 4 is a plan view of the apparatus of Figure 1 with parts broken away.

Shaft 54 is supported respectively at the top and bottom by insulated bearings 67 and 69 and is rotated with a step-by-step progressive movement, so that the freezing tubes are successively included within the secondary circuit of the transformer. This step-by-step movement is imparted to shaft 54 at the top of the shaft through a drive shaft 70 which is insulated electrically from shaft 54 at 71. Drive shaft 70 extends through bearings 72 and 73 and at the top has keyed to it a ratchet wheel 74 shown best in Figure 4 and having twenty-three teeth. Ratchet wheel 74 is engaged by a dog 76 carried by an actuating arm 78 and spring-pressed by a spring 77. Actuating arm 78 is pivoted on bearing 72 (Figure 1) and at its free end it carries a bracket 79 which is connected through a link 80 to an arm 81 of a crank-arm 82 (Figure 1) mounted on a fixed bracket 86 to rock about a horizontal axis 84. Rocking movement is transmitted to crank-arm 82 through its other arm 83 by a solenoid unit 88. Bracket 79 of arm 78 is also connected through a pivoted knuckle pin 93 to one end of (Figure 4) a tension spring 90 the other end of which is mounted by a knuckle pin 91 on a fixed pivot 92; spring 90 is under tension biasing actuating arm 78 counter-clockwise with the elements in the positions shown in Figure 4. However, upon the energization of solenoid unit 88, arm 83 is pulled down, and crank-arm 82 is rocked about its pivot so that arm 81 is lifted (Figure 1) with the result that link 80 swings actuating arm 78 clockwise (Figure 4). During this movement, dog 76 slides over one tooth on the ratchet wheel 74; thereafter the solenoid is deenergized and spring 90 swings arm 78 back to the position of Figure 4. Dog 76 carries the ratchet wheel with it so that the ratchet wheel is rotated one step, and (Figure 1) arms 56 and 58 are moved to the next freezing tube.

The operation of this apparatus is controlled by a timer 93 (shown at the left in Figure 1) so that the ice is harvested in each tube when the cubes reach the desired size. The harvesting operation is carried on by starting (see Figure 3) with the tube indicated 10a at the point where the gas refrigerant is discharged through pipe 36, and when the electric circuit through this tube has been completed by the proper positioning of arms 56 and 58, current is supplied through lines 68 to the primary of transformer 48. The duration of this current is very short, for example, ten seconds, and this frees the ice. In this embodiment current is supplied to energize solenoid unit 88 simultaneously with the harvesting of each tube. Thus, at the time the current is turned on to energize transformer 48, current is also turned on to energize the solenoid unit, and the elements for turning the ratchet wheel are moved to their positions shown in Figure 1. When the harvesting current is turned off, solenoid unit 88 is simultaneously deenergized with the result that spring 90 is permitted to return the elements to the positions of Figure 4 and in this way advance the arms 56 and 58 to engagement with the next freezing tube 10b which is then harvested.

The other tubes 10 are harvested in succession around the bank of tubes in a counterclockwise direction. The refrigerant flows around the spiral passageway 31 clockwise, i. e., in the direction opposite to the direction in which the tubes are harvested. Thus, the refrigerant flowing from a tube which is being harvested flows past the tubes which have been last harvested. This precludes the possibility of tempering or warming the ice in a tube by bubbles of warm refrigerant gas just before harvesting.

During each period that the harvesting current is turned on the current to compressor motor 39 is turned off. However, motor 39 has mounted on its shaft a flywheel having sufficient momentum to drive compressor 40 for the short period of time that the harvesting current is on. In this way, an undesirable power leak is avoided on the electric power supply circuit. The power to motor 39 is turned off by the same relay and with the same movement as that used for turning on the power to the current transformer 48. As shown best in Figure 2 the twenty-one freezing tubes are evenly spaced, but a space is provided between tubes 10a and 10u in which the refrigerant supply and withdrawal pipes 32 and 36 are positioned. As shown in Figure 4 the float valve assembly 46 is positioned directly above the refrigerant supply and discharge pipes so that the entry of water to tank 12 does not interfere with the flow of water down any of the freezing tubes.

Referring to the left-hand side of Figure 1 blank commutator segments 95 are provided between the segments 60 for tubes 10a and 10u so that brushes 62 will pass readily. Thus, as the distributor arms 56 and 58 move from the commutators for tube 10u, they move successively to two pairs of blank commutator segments 95 and thence move on to the commutator segments for tube 10a. Under some circumstances it is desirable to prevent the turning on of the harvesting current while the distributor arms are opposite the blank commutator segments 95. Accordingly, positioned directly above the commutator segments 95 and electrically connected into the supply lines 68 for transformer 48 is a cutout switch 97. Supply lines 68 extend from cutout switch 97 through ring 28 and the wall of casing 2 to timer 93. Switch 97 is normally closed but is opened by the engagement and swinging of a switch arm 99. As shown at the right, distributor arm 56 carries a cam arm 101 which is so positioned that it engages switch arm 99 during the time that the distributor arm is opposite the blank commutator segments 95. Thus, as the distributor arms are stepped around from one set of segments to the next, timer 93 turns on the current to leads 68 each time that the distributor arms are stopped, and no special provision need be made for preventing the turning on of current to the transformer when there is no freezing tube in the circuit.

In the illustrative embodiments of the present invention, each of the freezing tubes 10 is divided into six freezing zones, in each of which a cube of ice is formed. These freezing zones are separated from one another by electric heating units which surround each of tubes 10 at the edges of the freezing zones. These heating units are shown in the right-hand portions of Figure 1 at 94, there being seven heating units on each of the freezing tubes 10. Heating units 94 are similar in structure and operation to the heating units in my copending application referred to above; each heating unit is in heat transmitting contact with the outer surface of its freezing tube 10, and it is embodded in the rubber or plastic surrounding the tubes. The heating units for each tube are connected in series and power is supplied thereto through a pair of terminals 96 (only one of which is shown) at the top of the upper freezing zone. When the apparatus is operating, all of the heating units 94 are energized continuously, and they add only sufficient heat to the adjacent annular zones of the tubes to limit the formation of ice to the freezing zones.

The water flows in thin even sheets down the tubes, and the flow is determined by the size of the nozzles 14 and the water head maintained in tank 12 by float valve 46. The flow is sufficient to cause the ice being formed to be clear, and as indicated above, the excess water flows from the bottom of the tubes through screen 16 into sump tank 18. As each tube is harvested, its ice falls from the bottom of the tube onto screen 16 where it is deflected out of the side of tank 18 into a storage bin (not shown). Screen 16 is spaced a sufficient distance below the bottoms of the tubes to permit the ice cubes to fall free from the tubes.

Figure 3:
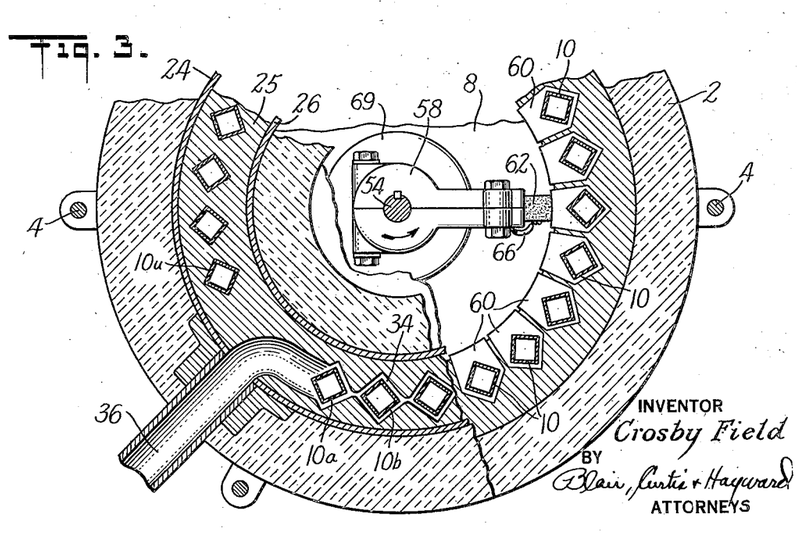
Figure 3 is a section on the line 3—3 of Figure 1.

Referring to Figures 2, 3, and 4 as the harvesting of the various tubes progresses counterclockwise due to the step-by-step movement of rachet wheel 74, the refrigerant flows along its spiral path clockwise. Thus, the refrigerant is flowing from the tubes which have not been harvested past the tube being harvested and thence past the tubes which have been harvested most recently. In this way such heat as is produced in each tube during harvesting is taken up by refrigerant being evaporated; any slugs of superheated gas that are formed do not pass from a tube being harvested to a tube to be harvested, but rather, they pass to the tube which has been harvested most recently. In this way each tube with its ice is supercooled at the time its harvesting operation is started, and after the harvesting operation on a tube is completed, the tube is not subjected immediately to a sudden cooling effect.

Except as otherwise shown, the freezing tube assembly of the embodiment in Figures 5 to 8 is the same as in the embodiment of Figures 1 to 4. However, in the embodiment of Figures 5 to 8 tubes 10 are flooded with water at all times; that is, they are completely filled with water, and there is a constant head of water in tank 12. The ice is harvested by passing current through the freezing tubes and then floating the ice cubes to the surface of the water in tank 12. Accordingly, the upper ends of freezing tubes 10 are unrestricted, and when the harvesting current is turned on, the ice moves upwards out of the tubes at a fairly rapid rate. During the freezing operation air is supplied to the bottom of each tube to cause the ice to be clear and hard. Accordingly, as shown in the lower, right-hand portion of Figure 5 the bottom of each freezing tube 10 is provided with a plastic plug 100 into which is fitted the end of a flexible rubber air tube 102.

Figure 5:
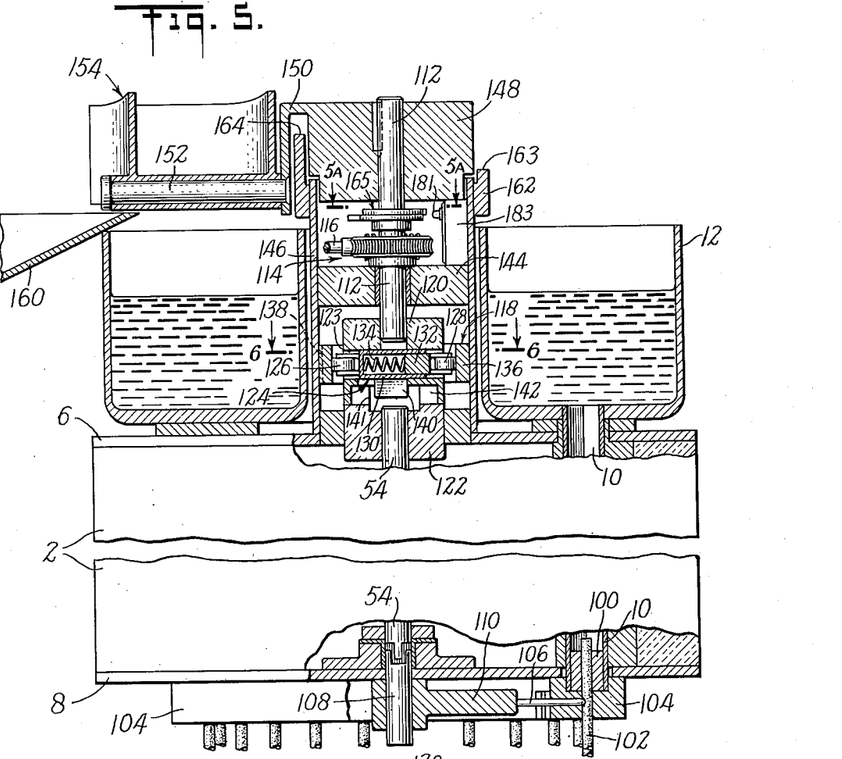
Figure 5 is a view similar to Figure 1 with the central portion of the apparatus broken away and showing another embodiment of the invention.
Figure 5A:
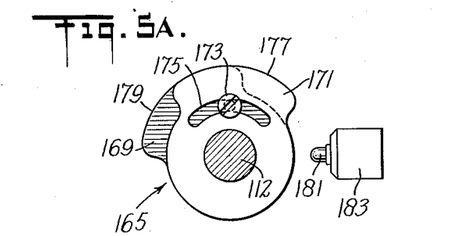
Figure 5a is a relatively enlarged sectional view on the line a—a of Figure 5.
Figure 6:
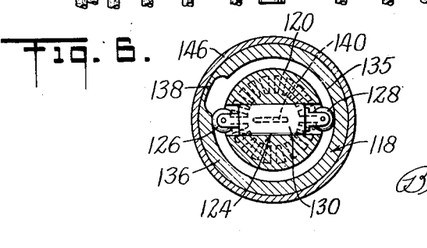
Figure 6 is a sectional view on the line 6—6 of Figure 5.
Figure 7:
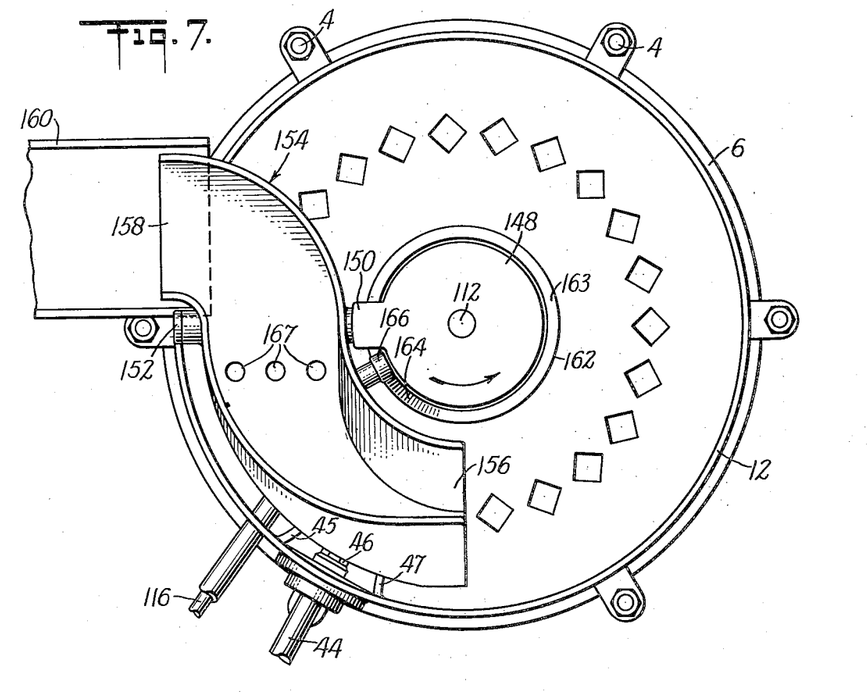
Figure 7 is a top-plan view of the embodiment of Figure 5.
Figure 8:
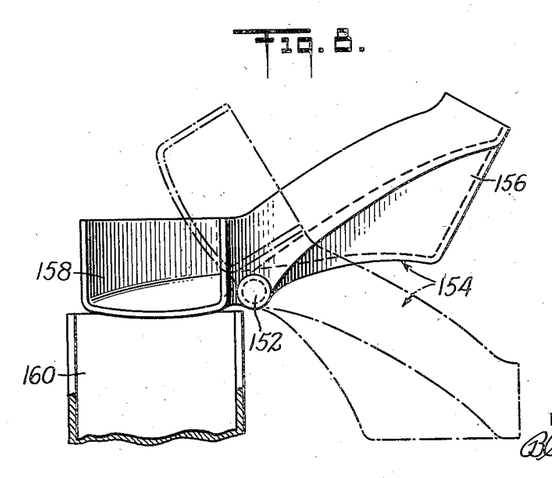
Figure 8 is a side elevation of the ice scoop of the embodiment of Figure 5.

Surrounding the lower end of each freezing tube 10 and the adjacent portion of its tube 102 is a hard plastic valve block 104 which carries a valve slide 106 in the form of a flat strip of metal. Valve slide 106 is normally pushed to the left by the resiliency of tube 102, but it may be projected to the right so that its end squeezes the tube 102 and shuts off the air. The lower end of shaft 54 is provided with a shaft extension 108 which carries a cam arm 110 which is in vertical alignment with the distributor arms 56 and 58 (Figure 1). When the distributor arms are moved to the position to supply harvesting current to one of freezing tubes 10, cam arm 110 is also moved into engagement with the valve slides 106 of that freezing tube. In this way the air is shut off from each freezing tube during its harvesting operation, and after the harvesting operation is completed, cam arm 110 moves on and air is turned on again. The step-by-step movement is transmitted to shaft 54 from a vertically aligned driving shaft 112 driven by a worm drive assembly 114 from a horizontal shaft 116. Shaft 112 is rotated at a constant rate, and an intermittent driving movement is produced by an intermittent clutch assembly 118, which has a driving block 120 keyed to shaft 112 and a driven block 122 keyed to shaft 54.

Blocks 120 and 122 are annular and the lower face of block 120 is positioned against the upper face of block 122. Extending across a diameter of the lower face of block 120 is a square groove 123, and slidably received within this groove is a roller assembly 124 (see also Figure 6). Roller assembly 124 has two rotatably mounted rollers 126 and 128 at its ends; roller 126 is carried by a square shell 130, and roller 128 is carried by a square block 132 slidably received in the right-hand end of shell 130. A compression spring 134 pushes block 132 in one direction (i. e., to the right in Figure 5) and due to the sliding fit of shell 130 in groove 123, the spring also pushes shell 130 in the opposite direction. Rollers 126 and 128 are therefore projected radially and held in engagement with an annular raceway 135 formed by the inner surface of a fixed collar 136 (see Figure 6). Raceway 135 is circular except at the left in Figure 6 where it has a cam portion 138 of increased radius. Thus, as shaft 112 rotates at a constant speed, rollers 126 and 128 roll around the raceway, and each of them is held at the radius shown except at the cam portion 138. When one of the rollers reaches this cam portion, the roller moves outwardly to the bottom of the cam portion, and after a predetermined further arcuate movement, the roller is returned radially to the position shown.

As shown in Figure 5, block 122 has on its upper face a circular recess 141, and projecting downwardly into this recess from shell 130 is a dog 140, integral with shell 130. Surrounding the top of recess 141 and projecting radially inwardly toward dog 140 are twenty-three teeth 142. Dog 140 is so positioned on shell 130 that when roller 126 is in the position shown in Figure 6, the dog is held out of engagement with teeth 142. However, when roller 126 rolls into the cam portion 138 of the raceway, dog 140 is carried by shell 130 outwardly into engagement with one of the teeth 142. When dog 140 is engaged with one of the teeth 142, block 122 is moved by the dog so that rotary movement is imparted to shaft 54. The arc of cam position 138 is such that each engagement of a tooth by dog 140 results in the moving of shaft 54 an arcuate distance equal to the distance between adjacent freezing tubes 10. Thus, during one revolution of shaft 112, roller 26 rolls around the raceway to the cam portion 138 where it moves outwardly and carries its dog 140 into engagement with one of the teeth 142. The rotation of shaft 112 is then transmitted directly to shaft 54 to move the distributor arms 56 and 58 (Figure 1) and cam arm 110 (Figure 5) from one freezing tube to the next freezing tube. When these arms have reached this next freezing tube, roller 126 rides out of the cam portion 138 and dog 140 is thereby disengaged with the tooth.

When roller 128 reaches the cam portion 138, it also rides outwardly into the cam portion, but it is accompanied only by its block 132, and dog 130 is not moved radially. Thus, the movement of roller 128 produces no movement of shaft 54 and for each revolution of shaft 112, arms 56, 58 and 110 are advanced only from one tube to the next. Under some circumstances it may be desirable to prevent roller 128 from riding down into the cam portion 138. This done by providing a cam portion 138 which is narrow in width or in arcuate extent, and then providing a small roller 126 and a large roller 128 such that roller 126 will move outwardly at the cam portion, whereas roller 128 will not.

As pointed out above in this embodiment the ice cubes float to the surface of the body of water in tank 112 as the various tubes are harvested. Means is thereby provided to remove the ice from this body of water by, in a sense, "skimming" the surface of the water. Shaft 112 is rotatably mounted in a fixed collar 144 carried by the stationary vertical sleeve 146 which extends upwardly in the center of tank 12. To the upper end of shaft 112 is keyed a block 148 which covers the top of cylinder 146, and which, as shown at the left in Figure 5, has an integral overhanging bracket 150. Bracket 150 carries a horizontal stud shaft 152 upon which a scoop 154 is swingably mounted to rock between the broken and full line positions of Figure 8. When the scoop is in the broken line position, its forward portion 156 is immersed in the water in tank 12 so that the ice is skimmed from the water, and when in the full-line position, its rear-end dumping portion 158 is positioned to direct the ice cubes radially over the side of tank 12. Thus, the scoop is normally positioned as shown in broken lines, and is moved around tank 12 with the forward portion 156 leading, i. e., counterclockwise in Figure 7, so that the ice cubes floating on the surface of the water are collected in the scoop. The forward end of the scoop is then raised by rocking the scoop to the position of Figure 7, and this causes the ice cubes to slide rearwardly along the scoop where they are directed over the side of the tank into a chute 160.

As stated above, the water level in tank 12 is maintained by a float valve assembly shown best in Figure 1, and partitions 45 and 47 are provided with holes 49 (Figure 1) so that the water flows freely through the partitions. During each rotation of shaft 112 (Figure 7) scoop 154 moves around tank 12, and as its forward end 156 approaches partition 45, the scoop is rocked to lift its forward end. This rocking movement continues, and the ice cubes are dumped over the side of tank 12. Immediately, thereafter, the forward end of the scoop moves downwardly again to the skimming position; that is, the broken-line position of Figure 8. The movement of the scoop around the tank causes a circular flow of the water around the tank. Thus, ice cubes floating in tank 12 adjacent partition 47 are carried counterclockwise (Figure 7) away from the partition so that they are ahead of the forward end of the scoop when it is lowered into the water.

The rocking movement and position of scoop 154 is controlled by a cam ring 162 welded (see Figure 5) to the outer surface of cylinder 146, and having a top cam surface 163. Cam surface 163 is level except at 164 where it rises (see Figure 7), and upon this cam surface rests a roller 166 pivoted to the adjacent side of scoop 154. Roller 166 is positioned in leading relationship with respect to stud shaft 152, and as it rolls around the cam surface at 164 the scoop is rocked by lifting the forward end. This dumps the ice and immediately thereafter, the scoop is returned by gravity to the broken-line position of Figure 8. The lower edge of the scoop is then held above the bottom of tank 12 by roller 166 which rests on the level portion of the cam surface 163. Scoop 154 is of plastic which is light in weight and which has low thermal properties; thus, the ice is removed without excessive loss and without adding heat to the water in the tank 12. Scoop 154 is provided with holes 167 through which the water escapes as the scoop is lifted.

In this embodiment the turning on and off of the harvesting current is controlled mechanically and this is synchronized with the step-by-step movement of the distributor and cam arms. Accordingly, positioned beneath block 148 and clamped to shaft 112 is an adjustable cam assembly 165 formed by a lower cam 169 which is rigidly fixed to shaft 112 and an upper cam 171 which is free to rotate on shaft 112 but which is clamped to cam 169 by a screw 173 extending through a slot 175 and threaded into cam 169. When screw 173 is loosened, cam 171 may be moved with respect to cam 169 from one extreme position wherein its cam surface 177 is coincident with the cam surface 179 of cam 169, and the other extreme position wherein the two cam surfaces are extended and in effect present a cam surface of twice the arcuate extent of one of the cam surfaces. Positioned in alignment with the two cam surfaces on the inner wall of cylinder 146 is an actuating button 181 of a switch 183. Shaft 112 rotates at a constant speed and the cam surfaces 177 and 179 engage button 181 and close switch 183. Thus, by changing the adjustment of cam 171 with respect to cam 169 the length of time that switch 183 is held closed is adjusted. The cams are so positioned on shaft 112 with respect to dog 140 that immediately after the distributor arms 56 and 58 have been moved to a freezing tube, switch 183 is closed, and this connects the current to the primary of transformer 48. The arcuate extent of the cam surfaces 177 and 179 may be accurately adjusted so as to carefully control the time during which the harvesting current flows.

Figure 9:
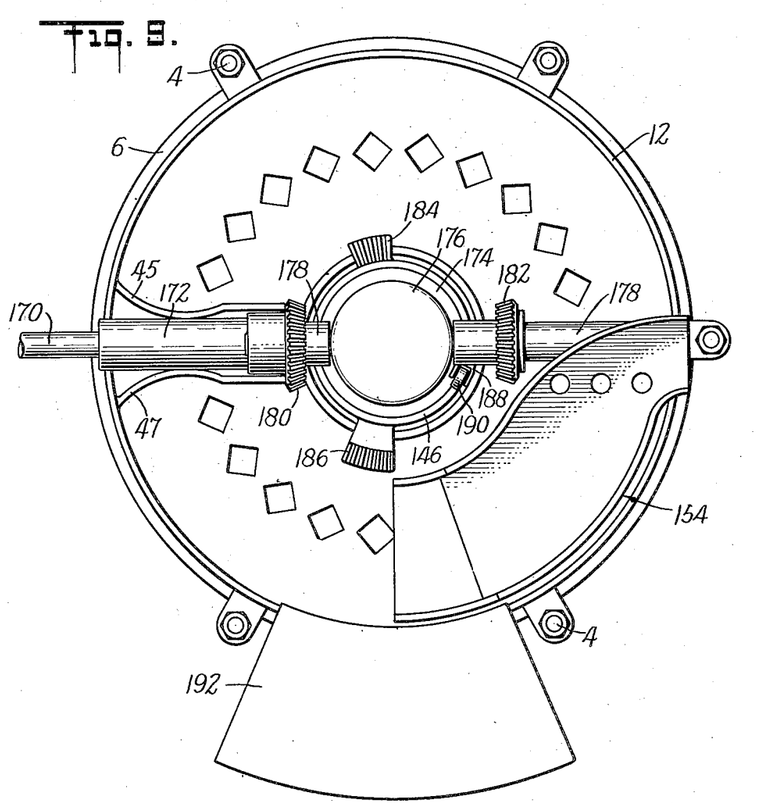
Figure 9 is a view similar to Figure 7 but showing another embodiment of Figure 5.
Figure 10:
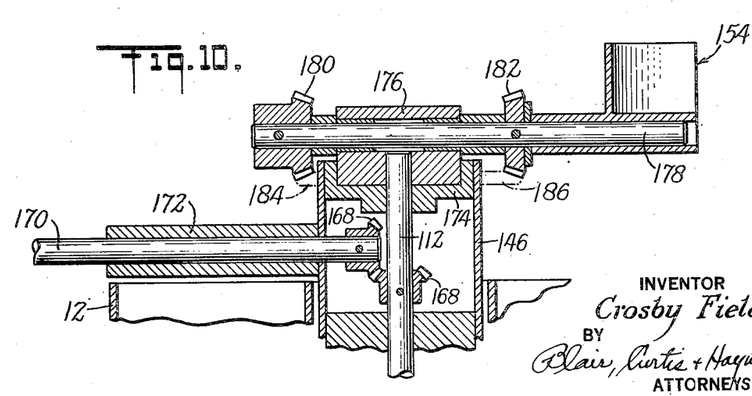
Figure 10 is a view similar to the upper portion of Figure 5 and showing certain of the working parts of the embodiment of Figure 9.

Another embodiment of the scoop-operating mechanism is shown in Figures 9 and 10, wherein, shaft 112 (Figure 10) is driven through a pair of bevel gears 168 by a shaft 170 carried in a sleeve bearing 172. At the top of cylinder 146 is a fixed annular bronze bushing 174 which carries a rotatable plug 176. Rotatably mounted in plug 176 is a horizontal shaft 178 at the left end of which is keyed a pinion 180, and at the right end of which is keyed the scoop 154. Keyed to shaft 178 adjacent scoop 154 is a pinion 182 which is positioned at a greater radius from the axis of shaft 112 than pinion 180. As shown in Figure 9, welded to the side of cylinder 146 in circumferential alignment with pinion 180 so as to be in the path of travel thereof is a rack 184 (see the broken-line indication in Figure 10), and similarly mounted in circumferential alignment with pinion 182 is a rack 186. Keyed to shaft 178 adjacent pinion 182 is a roller arm 188 carrying a roller 190 which normally rides on the top rim of cylinder 146, thereby to support the forward end of the scoop at the proper level.

In this embodiment a harvesting operation is carried on in a clockwise direction and shaft 112 is rotated continuously. As the forward end 156 of scoop 154 approaches partition 45, pinion 180 engages rack 184 so that shaft 178 is rocked and the forward end of the scoop is lifted, and the ice is dumped over the side of tank 12 into a chute 192. Immediately thereafter, pinion 182 engages rack 186 rocking shaft 178 back to its original position and scoop 154 is swung back down to the broken line position of Figure 8 with roller 190 riding on the top of cylinder 146. Thus, the scoop is moved by a positive gear drive in dumping the ice and also in returning to the ice-skimming position.

Figure 11:
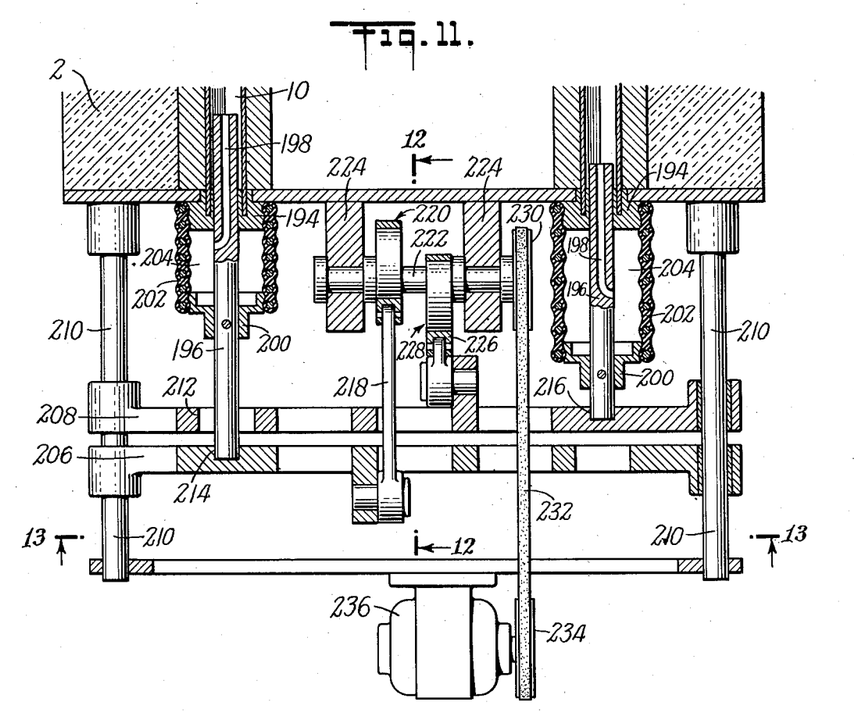
Figure 11 is a view similar to the lower portion of Figure 5 but showing another embodiment of the invention.
Figure 12:
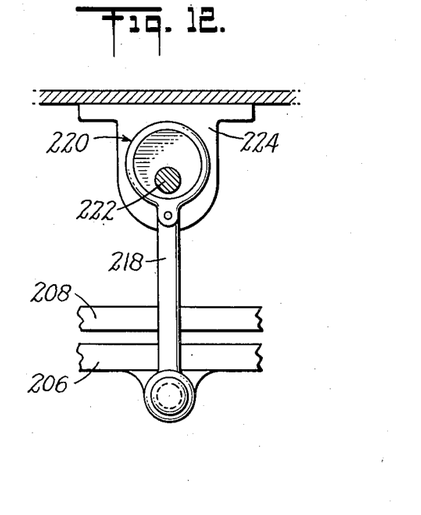
Figure 12 is a sectional view on the line 12—12 of Figure 11.
Figure 13:
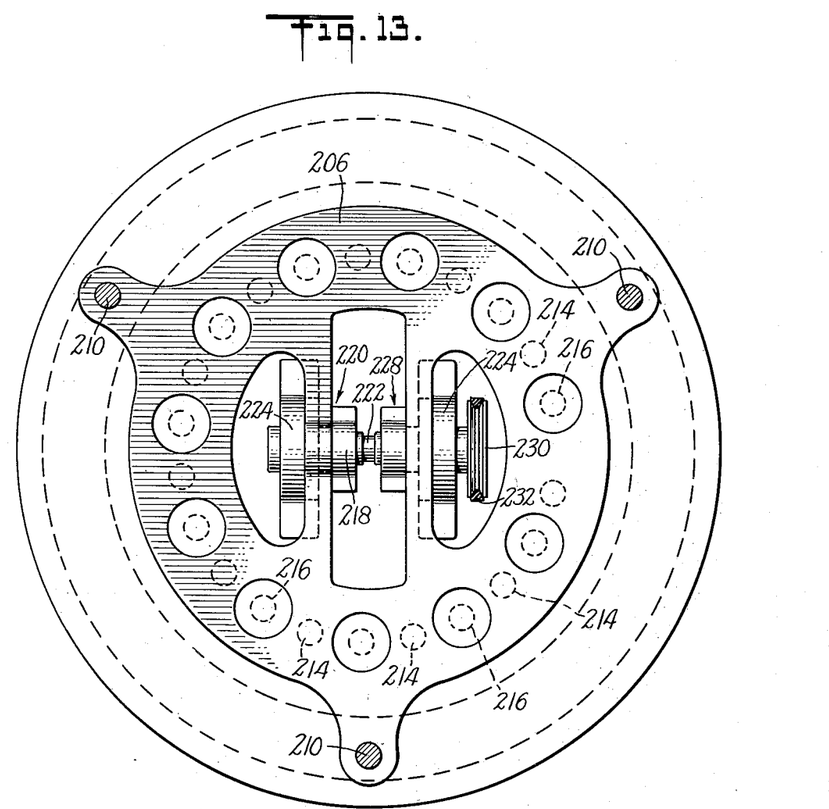
Figure 13 is a horizontal sectional view on the line 13—13 of Figure 11.

Under some circumstances it is desirable to provide for the mechanical agitation of the liquid being frozen, this agitation being in place of or in addition to agitation by air, all depending upon the conditions of operation and the particular liquid being frozen. In Figures 11 to 13 plunger apparatus is provided to agitate the liquid in the freezing tubes 10 by causing a rapid up and down flow of liquid in the tubes. Accordingly enclosing the bottom end of each tube 10 is a ring 194 and extending through the central opening of each ring 194 is a plunger 196. The lower end of each plunger 196 carries a sealing ring 200, and attached at its ends, respectively to this sealing ring and ring 194, is a flexible sleeve 202, which forms a sealed chamber 204 around plunger 196. Plunger 196 has at its upper end a central bore 198 which is open at the top of the plunger to the freezing tube 10 and has its lower end extending radially from the side of the plunger so that it opens to chamber 204; thus, chamber 204 is connected to tube 10 through bore 198.

Sleeve 202 is of rubber reinforced with a helical spring, whereby it is expansible longitudinally but maintains considerable rigidity during use. Thus, when plunger 196 is oscillated up and down, the elements 196, 200 and 202 oscillate up and down between the positions shown at the right and left of Figure 11. That is, the upper end of plunger 196 moves upwardly into freezing tube 10, and at the same time chamber 204 is reduced in size so that water passes from chamber 204 up through bore 198 and is directed axially up the freezing tube. The plunger is then moved down while the reverse actions take place with the plunger moving down from within the freezing tube and with chamber 204 being enlarged in size so that water is drawn from the bottom of the freezing tube through bore 198 to chamber 204. The fit between plunger 196 and ring 194 is loose, and water, or other liquid being frozen, may seep downwardly around the outside of the plunger. Air may be trapped in the top of chamber 204 to give a resilient or cushioned action.

The oscillatory movement of plunger 196 is produced by a balanced double-eccentric assembly. Accordingly, two similar horizontal webs 206 and 208 (see also Figure 13) are positioned one above the other and are slidably mounted on three fixed vertical shafts 210. Each web supports the lower ends of alternate ones of the plungers 196. Accordingly, alternate plungers are provided with extended ends, as shown at the left of Figure 11, which extend through openings 212 in web 208 to seats 214 in the upper surface of web 206. The other plungers rest in seats 216 in web 208. Near their centers the webs are provided with openings through which (see Figures 11 and 12) web 206 is connected by a crank rod 218 to a crank unit 220 on a crankshaft 222 mounted in a pair of bearings 224; similarly, web 208 is connected through a short crank arm 226 to a crank unit 228. Crank units 220 and 228 are in opposite phase so that the rotation of shaft 222 oscillates webs 206 and 208 simultaneously but always in opposite directions; that is, web 206 moves up as web 208 moves down, and vice versa. Crankshaft 222 is turned at a constant rate through a pulley 230, a V-belt 232, and a pulley 234 by an electric motor 236. Thus, all of the plungers 196 are oscillated to produce agitation in all of the freezing tubes in an efficient manner and with a minimum of vibration.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In ice-making apparatus, the combination of, a plurality of freezing tubes each having an inner surface upon which ice may be formed, refrigerating means including an evaporator assembly to subject the freezing tubes to a cooling effect from their outer surfaces, means to supply liquid to be frozen to the interiors of said tubes, and harvesting means to cause an electric current of high value to flow through the tube walls and thereby free the ice, said harvesting means including a distributor arm pivotally mounted to swing about a fixed axis and separate means electrically connected to each of said tubes and having a contact face which is engaged by said arm to complete an electric circuit through the tube.

2. Apparatus as described in claim 1, wherein said evaporator assembly is formed by rigid wall means and wall means therein of relatively deformable material with a plurality of passageways each of which extends past each of said tubes in succession thereby to form freezing zones within the tubes.

3. Apparatus as described in claim 1, wherein said evaporator assembly is formed by a pair of concentric cylindrical shells having therebetween an annular space with a resilient material substantially filling said annular space except for a helical passageway of a plurality of turns extending around said cylindrical space from one end thereof to the other, said freezing tubes being positioned with their axes parallel to the axis of said shells and extending through said annular space with each tube being exposed to said helical passageway at each turn thereof.

4. Apparatus as described in claim 1, wherein said tubes are positioned vertically in a substantially cylindrical bank and wherein said means to supply liquid includes a tank connected to the upper ends of the tubes and means to supply water to the tank so that water to be frozen flows into the tubes.

5. Apparatus as described in claim 1, wherein the freezing tubes are vertically positioned, and wherein restricted nozzles are formed at the upper ends of the tubes, and wherein said means to supply liquid includes tank means from which water to be frozen flows into the upper ends of said tubes through said restricted nozzles which direct the water down the side walls of the tubes with water being supplied in excess of that being frozen so that water flows from the bottoms of the tubes.

6. Apparatus as described in claim 1, wherein said means to supply liquid includes means to maintain the tubes flooded with water, and wherein the tubes are so constructed and arranged that the ice is harvested by floating it out of the ends of the tubes.

7. Apparatus as described in claim 1, wherein the tubes are vertically positioned, and wherein said means to supply liquid includes means to maintain the tubes flooded with water to be frozen, and said apparatus includes means to supply air to the bottom ends of said tubes.

8. Apparatus as described in claim 1, wherein the tubes are vertically positioned and wherein said means to supply liquid maintains the tubes flooded, and said apparatus includes fluid agitating means to cause an oscillating up-and-down flow of the water within the tubes.

9. Apparatus as described in claim 1, wherein said means to supply liquid to be frozen is effective to maintain the tubes flooded, and wherein said apparatus includes a plurality of fluid agitators associated respectively with one end of each of said tubes and including oscillating plunger means operating through the medium of the water being frozen to cause an oscillating flow of the water within the tubes.

10. Apparatus as described in claim 1, wherein said tubes are positioned in substantially a cylindrical bank, and said apparatus includes means to move the distributor arm of said harvesting means from one tube to another around the bank in step-by-step fashion comprising, a vertical shaft, a ratchet wheel mounted on said shaft, a dog assembly including a dog to engage said ratchet wheel and dog carrying means adapted to oscillate, and means to oscillate said dog carrying means.

11. Apparatus as described in claim 1, wherein said tubes are positioned in substantially a cylindrical bank, and said apparatus includes means to move the distributor arm of said harvesting means from one tube to another around the bank in step-by-step fashion comprising, a shaft, a ratchet drive for said shaft, and means to impart an oscillating movement to said ratchet drive comprising a spring-solenoid assembly.

12. Apparatus as described in claim 1, wherein said tubes are positioned in substantially a cylindrical bank, and said apparatus includes means to move the distributor arm of said harvesting means from one tube to another around the bank in step-by-step fashion comprising, a first shaft driven at a substantially constant speed, a second shaft coaxial with said first shaft with the shafts having adjacent ends, a driving member fixed to said first shaft including a dog and a dog carrying member adapted to move said dog radially, a driven member fixed to said second shaft and having a plurality of radial teeth adapted to be engaged by said dog, and means to cause said dog carrying member to move said dog into engagement with one of said teeth for travel through a predetermined arc during each rotation of said first shaft.

13. Apparatus as described in claim 1, wherein said tubes are positioned in a cylindrical bank and wherein said evaporator assembly and said tubes are so constructed and arranged that the ice is formed in pieces of predetermined length which move from the ends of said tubes by the action of gravity, and said apparatus includes means to intercept the pieces of ice after they emerge from the tubes.

14. Apparatus as described in claim 1, wherein said tubes are vertically positioned in a cylindrical bank and said means to supply liquid includes means whereby the tubes are open at their upper ends to an annular body of water and are maintained flooded with water to be frozen whereby the ice which is freed floats to the top of the annular body of water, and said apparatus includes means to remove the ice from the annular body of water comprising a scoop having a forward portion which is moved around the annular body of water to skim the ice bodies therefrom and a rearward portion which directs the ice radially with respect to the annular body of water after the ice has been lifted from the water.

15. In ice-making apparatus, the combination of, a bank of parallel freezing tubes positioned in side-by-side relationship, a plurality of contact segments equal in number to twice the number of said tubes individually mounted in pairs on the opposite ends of each of said tubes with the contact segments at each of the ends of the bank of tubes having adjacent contact faces which are positioned arcuately about a central axis, conductor means forming an electric current conducting circuit including a pair of arms positioned at the opposite ends of said bank of tubes so as to swing respectively concentrically with respect to the contact faces at the ends of the bank of tubes, means forming with said conducting circuit a transformer for producing a current of high value through said conducting circuit, means to freeze ice in said tube, and means to move said conductor means whereby said tubes are connected successively into said conducting circuit with the result that ice formed in the tubes is freed.

16. In ice-making apparatus, the combination of, a cylindrical bank of vertical parallel freezing tubes positioned in side-by-side relationship about a vertical axis, two sets of contact segments individually mounted respectively on said tubes with one set of the contact segments being positioned adjacent the top of the tubes with one segment of the set being mounted on each of the tubes and with the segments of the set having adjacent contact faces which are positioned arcuately and with the other of said sets of segments being positioned adjacent the bottom of the bank of tubes mounted respectively upon the tubes and having arcuately positioned contact faces, conductor means forming an electric current conducting circuit including a central member positioned along said axis and a pair of arms positioned respectively at the ends of said central member with the free end of each of the arms opposite and adapted to move into contact with the adjacent set of said contact faces, means forming with said conducting circuit a transformer for producing an electric current of high value through said conducting circuit, means to freeze ice in said tubes, and means to swing said conductor means about said axis whereby said tubes are connected successively to said conducting circuit with the result that the electricity flows through the walls of the tubes and ice formed in the tubes is freed.

17. In ice-making apparatus, the combination of, a freezing tube assembly formed by a plurality of parallel freezing tubes, an evaporator and supporting construction surrounding the main portion of each of said tubes and forming evaporator sections around each of said tubes whereby each of said tubes is subjected to a cooling effect, said evaporator and supporting construction being formed by a plurality of sheet metal wall structures having plastic therebetween which form evaporator passageways, a plurality of contactors equal in number to the number of said tubes and positioned at one end of said tubes with the contactors being fixed respectively to the tubes, and means to form an electrical circuit through said tubes individually including an arm which is adapted to be positioned to engage said contactors individually and means connected to the end of each of said tubes opposite said arm to complete the electrical circuit through the respective tubes.

18. Ice-making apparatus as described in claim 17 which includes, a tank to contain water and thereby maintain said tubes flooded with water, and an ice discharge mechanism to remove ice bodies from the tank including a scoop and means to move the scoop along the surface of the water in the tank.

19. Ice-making apparatus as described in claim 18 wherein said ice discharge means includes, a vertical shaft, a horizontal shaft journaled on said vertical shaft and projecting radially with respect to the axis thereof, a scoop carried by said horizontal shaft, and a pair of gear and rack assemblies to rock said scoop to and from an ice-dumping position during rotation of said vertical shaft.

20. Ice-making apparatus as described in claim 17 wherein said freezing tubes are positioned with vertical axes in a cylindrical array, and said apparatus includes, a pair of rings positioned respectively at the ends of the array of tubes and providing rigid support at the ends of the tubes, and an annular tank positioned on the top of the upper ring and having openings in its bottom wall to said tubes.

21. In the art of making congealed bodies of uniform size and shape, the steps of, flooding a passageway with a liquid to be congealed, creating alternate freezing and heating zones along the axial extent of said passageway by refrigerating and heating alternate bands of the passageway, producing heat to free the bodies, and floating the bodies upwardly through the uncongealed liquid.

22. In the art of making congealed bodies, the steps of, flooding a passageway with a liquid to be congealed and providing a free body of water above the passageway and open thereto, creating alternate freezing and heating zones along the axial extent of said passageway by refrigerating and heating alternate bands of the passageway, producing heat to free the bodies, floating the bodies upwardly through the uncongealed liquid and from the passageway into the free body of water and removing the bodies from the free body of water.

23. In the art of making congealed bodies, the steps of, flooding a plurality of parallel vertical passageways which are arranged with their axes substantially along a cylindrical surface with a liquid to be congealed and forming an annular body of water above the passageways open thereto at the upper ends, creating alternate freezing and heating zones along the axial extent of each of said passageways by refrigerating and heating alternate bands thereof, producing heat to free the bodies, floating the bodies upwardly through the uncongealed liquid into the annular body of liquid and gathering the bodies by an arcuate movement around said annular body of liquid.

24. In ice-making apparatus, the combination of, a plurality of freezing tubes each having a surface upon which ice may be formed, refrigerating means including an evaporator assembly to subject spaced zones of each of said tubes to a cooling effect thereby to form ice bodies when liquid to be frozen is present, and means to supply liquid to be frozen to the freezing surface in said zones of each of said tubes, said evaporator assembly including rigid wall means and plastic retained by said rigid wall means and forming evaporator passageways through which liquid refrigerant passes and is evaporated in heat exchange relationship with said zones of said tubes.

25. Apparatus as described in claim 24 wherein said tubes are positioned in a cylindrical array with vertical axes and with said freezing surfaces being the inner surfaces of the tubes, and wherein said rigid wall means which forms part of the evaporator assembly comprises a pair of metal cylinders of different diameters concentrically positioned and providing an annular space therebetween within which said tubes are positioned, and wherein said evaporator passageways are formed by a helical passageway of a plurality of complete turns extending between said cylinders and past the outer surface of each of said tubes in each turn.

26. In ice-making apparatus, the combination of, a plurality of vertical freezing tubes positioned in side-by-side relationship and each presenting an inner freezing surface upon which ice may be formed, refrigerating means including an evaporator assembly to subject the freezing tubes to a cooling effect from their outer surfaces, means to supply liquid to be frozen to the interiors of said tubes, and harvesting means to harvest said tubes serially including a rotary shaft and stepping means to impart step-by-step rotary movement to said shaft, comprising a ratchet wheel mounted on said shaft, a dog adapted to engage said ratchet wheel, a dog supporting member providing support for said dog at the periphery of said ratchet wheel, and means to oscillate said dog holding means and said dog through a predetermined arc to turn said ratchet wheel.

27. In ice-making apparatus, the combination of, a plurality of vertical freezing tubes positioned in side-by-side relationship and each presenting an inner freezing surface upon which ice may be formed, refrigerating means including an evaporator assembly to subject the freezing tubes to a cooling effect from their outer surfaces, means to supply liquid to be frozen to the interiors of said tubes, said means to supply liquid to be frozen including a tank positioned at the top ends of said tubes and having a free passageway into said tubes with the tubes being maintained in flooded condition and with a body of water being maintained in said tank, means to harvest the ice bodies and to float them upwardly from said tubes into said body of water, and means to remove the bodies from said body of water comprising a scoop having a forward portion which is moved to skim the surface of the water and a rearward portion which directs the bodies horizontally beyond the edge of the body of water.

CROSBY FIELD.

REFERENCES CITED

The following references are of record in the file of this patent:

UNITED STATES PATENTS

| Number | Name | Date |
|---|---|---|
| 1,998,575 | Furnas | Apr. 23, 1935 |
| 2,149,000 | Udell | Feb. 28, 1939 |
| 2,200,424 | Kubaugh | May 14, 1940 |
| 2,221,212 | Wussow | Nov. 12, 1940 |

FOREIGN PATENTS

| Number | Country | Date |
|---|---|---|
| 668,100 | Germany | Nov. 25, 1938 |